US007331116B1

(12) United States Patent
Johnston et al.

(10) Patent No.: US 7,331,116 B1
(45) Date of Patent: Feb. 19, 2008

(54) MULTI-REEL MARKING APPARATUS

(76) Inventors: John Johnston, 258 Grand St., Redwood City, CA (US) 94063; William Anderson, 23652 Skyview Ter., Los Gatos, CA (US) 95033; Andrew Butler, 218 Cowper St., Menlo Park, CA (US) 94301; David Titzler, 425 Maureen Ave., Palo Alto, CA (US) 94306; Edward Cooper, 3436 Blackhawk Rd., Lafayette, CA (US) 94549; Christopher Tackind, 250 Cowper St., Menlo Park, CA (US) 94301; Heather Fleming, 460 Fernando Ave., Palo Alto, CA (US) 94306

( * ) Notice: Subject to any disclaimer, the term of this patent is extended or adjusted under 35 U.S.C. 154(b) by 0 days.

(21) Appl. No.: 11/556,326

(22) Filed: Nov. 3, 2006

Related U.S. Application Data

(60) Provisional application No. 60/733,899, filed on Nov. 4, 2005.

(51) Int. Cl.
*B44D 3/38* (2006.01)
*G01B 3/10* (2006.01)

(52) U.S. Cl. .......................................... 33/414; 33/764

(58) Field of Classification Search .................. 33/414, 33/413, 755, 756, 764
See application file for complete search history.

(56) References Cited

U.S. PATENT DOCUMENTS

| | | | | |
|---|---|---|---|---|
| 208,346 A * | 9/1878 | Taylor | ......................... | 33/764 |
| 3,046,663 A * | 7/1962 | Romero | ......................... | 33/414 |
| 3,078,581 A * | 2/1963 | Foster | ......................... | 33/414 |
| 3,126,637 A * | 3/1964 | Short | ......................... | 33/414 |
| 3,206,855 A * | 9/1965 | Fletcher | ......................... | 33/414 |
| 6,167,632 B1 * | 1/2001 | Shor | ......................... | 33/414 |

* cited by examiner

*Primary Examiner*—Christopher W Fulton

(57) ABSTRACT

A multi-line chalk reel is disclosed that may be comprised of three or more line reels disposed in a polar arrangement of parallel but distinct rotation axes that has a single method for engaging and disengaging a single drive arrangement to any one spool. This arrangement provides a variety of advantages, including a package solution of useful dimensions and a low part count to minimize parts in assembly. The single drive arrangement reduces cost, and provides for convenient access to individual spools.

1 Claim, 5 Drawing Sheets

MULTI-REEL MARKING APPARATUS

CROSS REFERENCE TO RELATED APPLICATION

This application claims priority to Provisional Application Ser. No. 60/733,899, filed on Nov. 4, 2005.

FIELD OF THE DISCLOSURE

The present disclosure relates generally to measurement tools, and in particular to marking tools.

BACKGROUND

Chalk lines are commonly used in the construction and building trades for marking measurements. It is common practice in construction layout to apply lines of differing colors and widths to differentiate the purpose of marks made. Repairing broken chalk line on a single reel can take time away from constructive working time. For these and other reasons, it is a common practice for builders familiar with such methods to carry multiple chalk line reels. Likewise, the advantage of integrating a winding advantage to collect deployed line back onto the chalk line spool is well established in the art and practice.

A number of dual and multiple reel chalk line inventions may be found in the prior art, typically embodied as an arrangement of spools in which a single handle may drive a stack of axially aligned spools and allow selective engagement of a spool through various means. However, these arrangements have certain disadvantages. For example, stacked spool arrangements may result in an over-wide package solution. Additionally, stacked spool arrangements necessitate the need for additional internal walls to separate chalk volumes.

Alternately, prior art spools may be mounted on separate axis and coupled to distinct means so that the use of any spool is selected by changing from one handle to another. The need to supply separate drive means for each spool significantly increases the necessary production cost of a multi-reel product and is generally inconvenient to use.

DETAILED DESCRIPTION

Embodiments of the present invention described in the following detailed description are directed at virtual agents. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
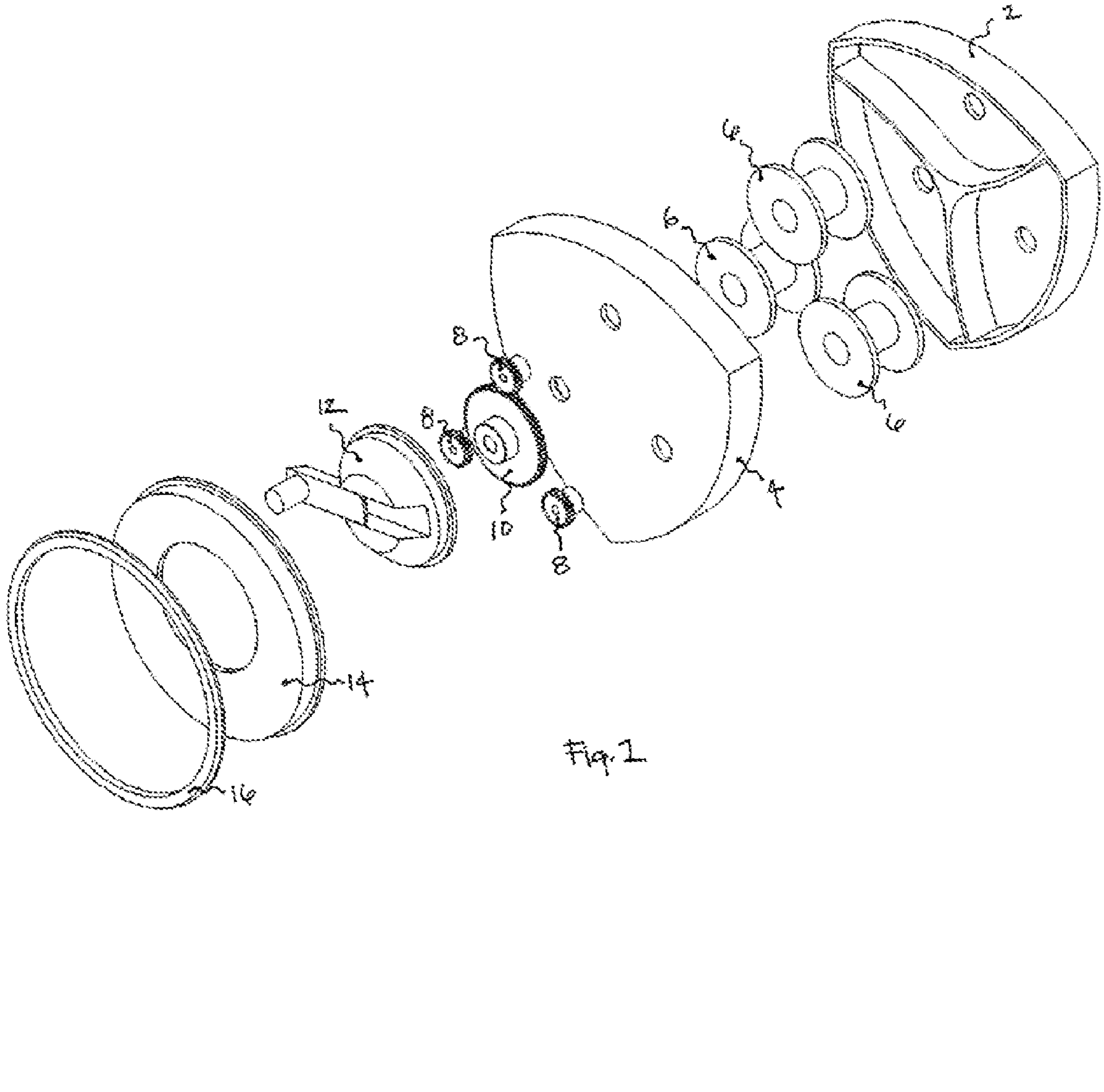
FIG. 1 is an exploded oblique view of one embodiment of a multi-reel chalk line in accordance with this disclosure.

FIG. 1 shows an exploded view of one embodiment of a multi-reel chalk line utilizing a polar arrangement of spools 6 captured in a chalk tight enclosure made up of a lower housing 2 and upper housing 4. Each spool is attached to a corresponding spur gear 8. Alternately, the spur gear feature can be contained in the spool 6 as a single part. Chalk filling, line access and sealing can be included by means common in the art and are not illustrated.

In this first embodiment, a drive gear 10 is attached to a handle assembly 12 and captured by a selector disk 14 and clamping ring 16. The selector disk 14 rotates about a virtual axis defined by the clamping ring 16. The clamping ring 16 fixes the selector ring 14, handle assembly 12 and drive gear 10 in relation to the chalk enclosure assembly, spools 6 and spur gears 8.

Figure 2:
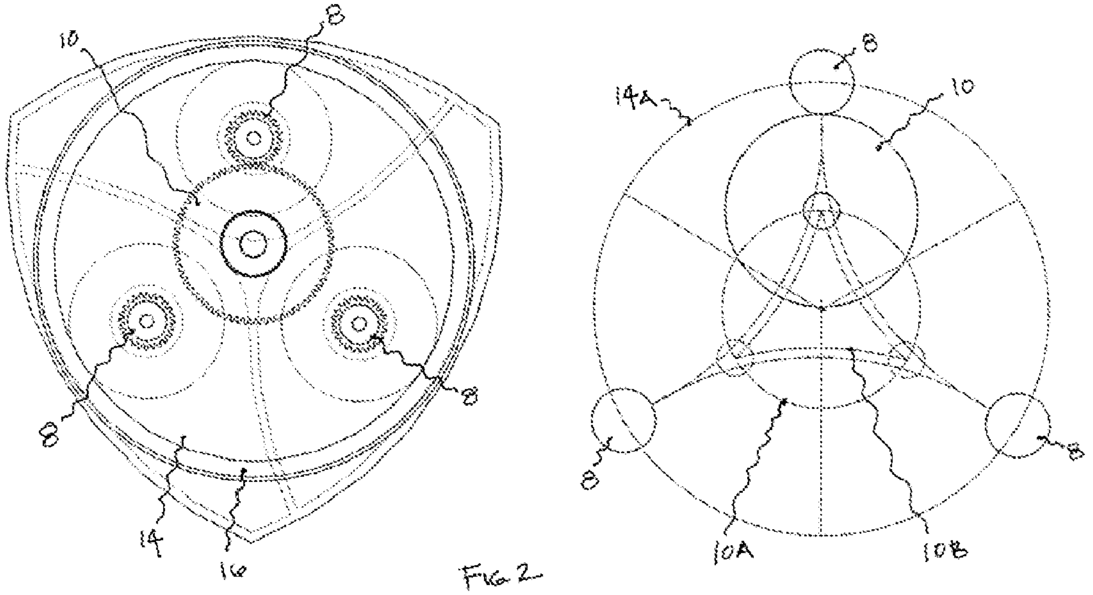
FIG. 2 is a front view of the first embodiment gear arrangement, and diagram of possible gear paths in accordance with this disclosure.

FIG. 2 shows a front view illustrating the arrangement of spur gears 8, selector disk 14, clamping ring 16 and drive gear 10. The spur gears 8 each rotate about an axis common with a respective spool 6. The spur gears 8 and spools 6 are arranged in the assembly such that they are equidistant from the virtual axis of the selector disk 14 and clamping ring 16. The drive gear 10 and handle assembly 12 are fixed so that they share a common axis of rotation. The axis of rotation of the drive gear 10 is offset from the virtual axis of rotation of the selector disk 14 so that the drive gear 10 will engage with each spur gear 8 at a discreet position as the selector disk 14 is turned about its' axis of rotation.

The diagram in FIG. 2 shows two possible paths that the drive gear 10 can follow as the selector disk 14 rotates. Path 10A is a simple circular path. Path 10B represents one possible complex path of many possible paths that may be employed to engage and disengage the drive gear 10 from each spur gear 8 at distinct positions as the selector disk 14 is rotated.

Figure 3:
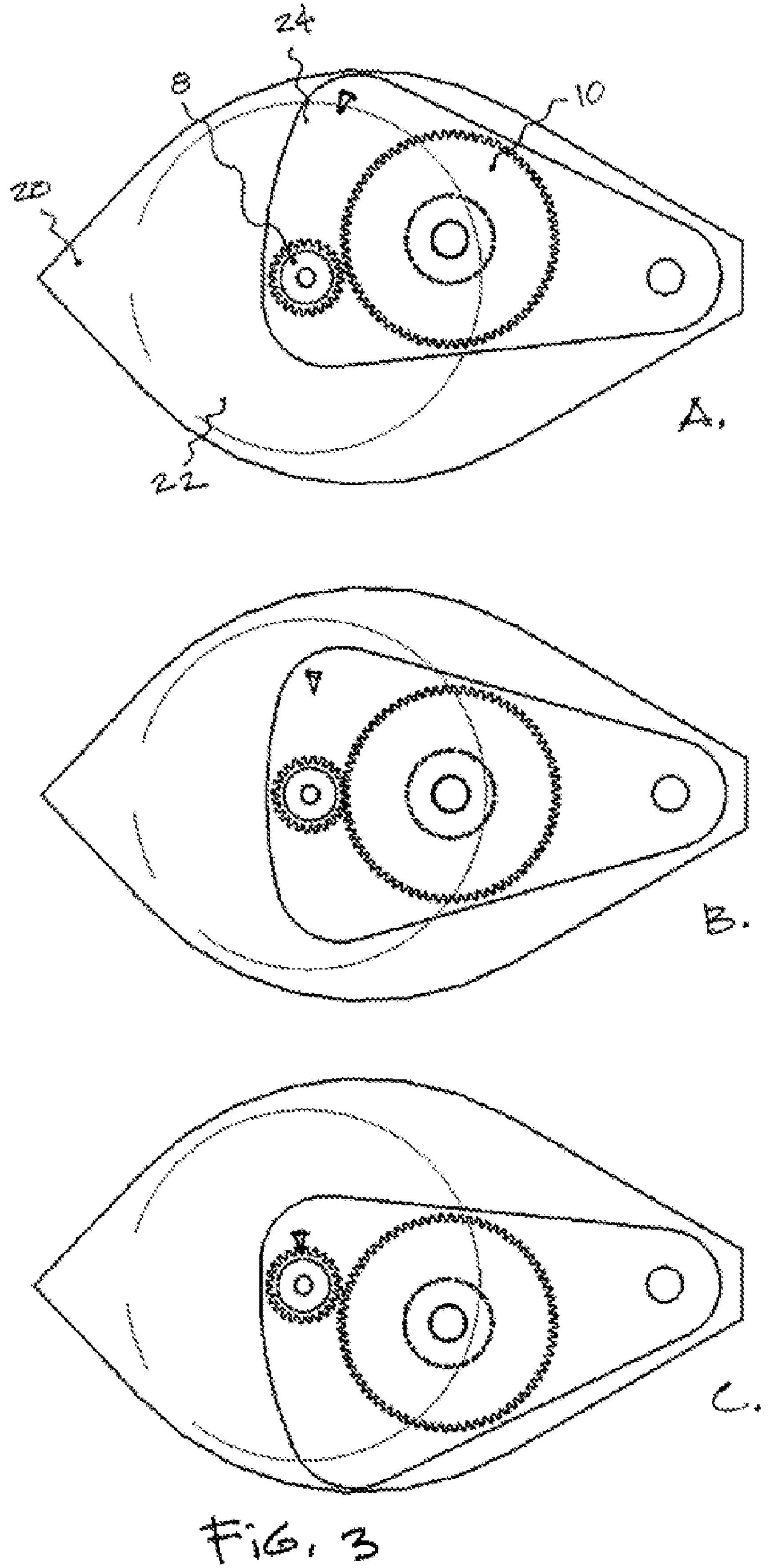
FIGS. 3A-C represent a sequenced illustration of single reel embodiment of selection means in accordance with this disclosure.

The method of rotating a drive gear 10 into engagement and disengagement with a coupling spur gear 8 is not limited in utility to a multi-reel configuration. FIG. 3 shows one possible embodiment of a single spool or shared axis multi-spool configuration. In FIG. 3A a drive gear 10 is fixed to a rotating selector arm 24. The selector arm 24 is positioned so that the spur gear 8 is free to rotate. In FIG. 3B the selector arm 24 is rotated down to engage the drive gear 10 with the spur gear 8. In FIG. 3C the selector arm is further rotated down so that the drive gear 10 is disengaged with the spur gear 8. In FIG. 3C a tooth feature 21 of the selector arm 24 is shown engaging the spur gear as means of preventing the spur gear 8 from rotating. These positions may be distinct and held by detent of other common means. Alternately, the positions shown in FIG. 3 may be momentary positions with means of automatically returning to a predetermined position once a user releases the mechanism.

Figure 4:
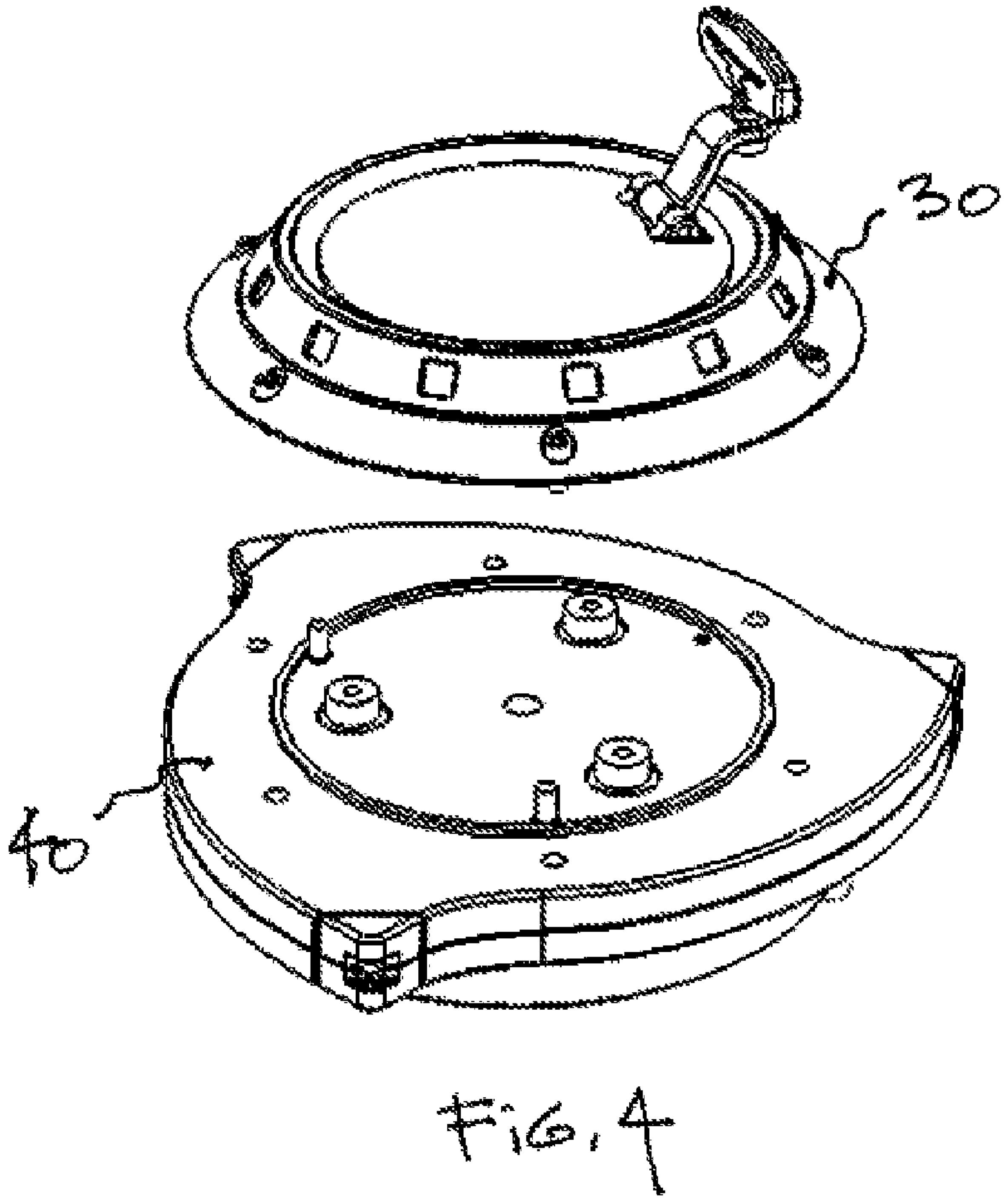
FIG. 4 is an exploded oblique view of a second embodiment of a multi-reel chalk line in accordance with this disclosure.
Figure 5:
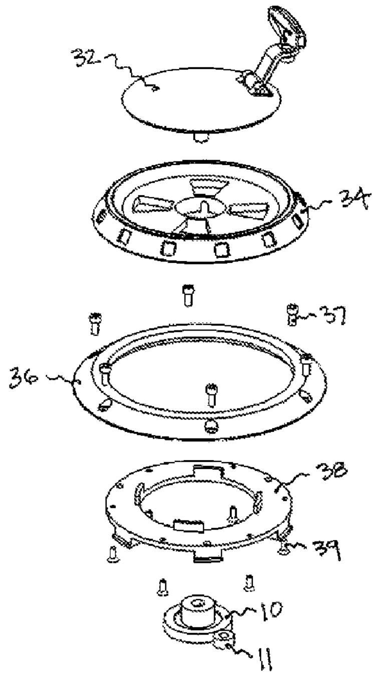
FIG. 5 is an exploded oblique view of the second embodiment drive assembly in accordance with this disclosure.
Figure 6:
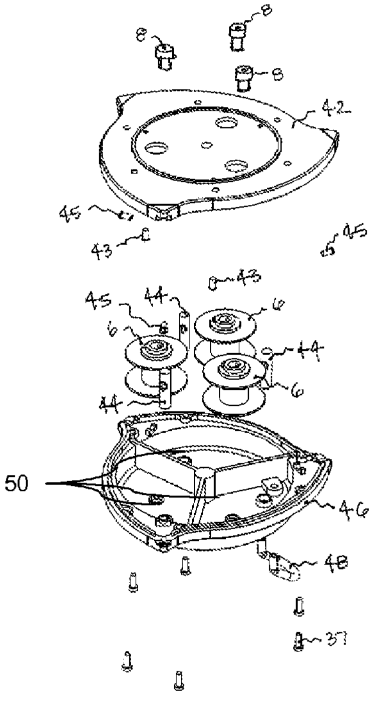
FIG. 6 is an exploded oblique view of the second embodiment reel case assembly in accordance with this disclosure.

FIGS. 4, 5 and 6 show a second embodiment of a multi-reel chalk line with a polar arrangement of spools 6 captured in a lower housing 46 and upper housing 42, making up a compartmented chalk & reel housing assembly 40. A drive arrangement assembly 30 provides means of coupling one handle, to a select spool.

FIG. 5 shows an exploded oblique view of the second embodiment of the drive arrangement assembly 30. In this second embodiment, a traveler gear 11 is coupled to a selector ring 34. The drive gear 10 is fixably attached to a handle assembly 32 and rotates about a common center axis. The selector ring 34 and a capture ring 38 traps the clamping ring 36. The clamping ring 36 provides means to fixably attach the drive arrangement assembly 30 to the housing assembly 40. The selector ring 34 holds the traveler gear 11 engaged to the drive gear 10. Rotating the selector ring 34 moves the traveler gear 11 into engagement with each spur gear 8 at a discreet position.

FIG. 6 shows an exploded isometric view of the housing assembly 40. The housing assembly three reels 6 trapped in a lower housing 46 and upper housing 42. Features of the housing parts 46, 42 create separated compartments for each spool with a single pass-out for line utilizing means common in single spool chalk enclosure.

FIG. 6 shows an accessory loop 48 attached to the housing assembly 40. Such a loop may be useful in transporting the tool through attachment of a clip, carabineer, lanyard, strap or a variety of other means. The loop 48 is configured allow the device to be attached to a belt, belt loop or other convenient point. The loop 48 is shaped to hold the device away from a users hip such that it will be comfortable and convenient to wear while walking. Such a feature may integrate features of the aforementioned attachments. Alternately, the housing 40 may employ a variety of means such as clips, magnets and other common methods for stowing and transporting similar tools.

Additional variations and embodiments of this invention can be created. The spur gear 8 may be integrated to the spool part 6. The selector ring 34 and capture ring may be integrated into one part or be otherwise designed in a variety of geometries. An assembly may have more than three reels. The reel may contain and deploy wound materials other than chalk lines. The invention could be made to house an ink line, dry line or a tape measure, a cord saw or a variety of other tool configurations. The handle assembly 32 may be embodied as a motor assembly, an adaptor for outside drive means, or a variety of other methods.

As will now be appreciated, a new and novel multi-line chalk reel has been disclosed that provides many benefits over the devices of the prior art. The multi-line chalk reel as disclosed may be comprised of three or more line reels disposed in a polar arrangement of parallel but distinct rotation axes that has a single method for engaging and disengaging a single drive arrangement to any one spool. This arrangement provides a variety of advantages, including a package solution of useful dimensions and a low part count to minimize parts in assembly. The single drive arrangement reduces cost, and provides for convenient access to individual spools.

The housing provides for flexible arrangement of line exits to facilitate convenient use of lines, the means to conveniently set spools in locked, engaged and freewheel states. The disclosed reel provides for a drive arrangement allowing integration of a winding advantage feature, and allows for uninterrupted use of tool when one lines breaks, and a single means of engaging and disengaging drive arrangement to spools provides for greater convenience and ease of use.

The disclosed reel provides for convenient use of multiple line colors in single tool, different line weights in single tool, and for integration of non-chalked lines in single tool, including but limited to ink lines, dry lines, measuring tapes, cord saw or other common flexible tools.

While embodiments and applications of this invention have been shown and described, it will now be apparent to those skilled in the art having the benefit of this disclosure that many more modifications than mentioned above are possible without departing from the inventive concepts disclosed herein.

We claim:

1. A multi-reel marking apparatus comprising:

a housing;

a plurality of chalk line reels disposed in said housing in a polar arrangement;

a single engaging mechanism; and wherein a selected one of said plurality of chalk line reels may be engaged with said single engaging mechanism.

* * * * *